United States Patent [19]

Shitara et al.

[11] Patent Number: 5,430,844
[45] Date of Patent: Jul. 4, 1995

[54] COMMUNICATION CONTROL SYSTEM FOR TRANSMITTING, FROM ONE DATA PROCESSING DEVICE TO ANOTHER, DATA ALONG WITH AN IDENTIFICATION OF THE ADDRESS AT WHICH THE DATA IS TO BE STORED UPON RECEPTION

[75] Inventors: Yasuharu Shitara, Ashikaga; Noboru Hayasaka, Ora; Toshiya Koskua, Ota, all of Japan

[73] Assignee: Sanyo Electric Co., Ltd., Osaka, Japan

[21] Appl. No.: 316,830

[22] Filed: Oct. 3, 1994

Related U.S. Application Data

[63] Continuation of Ser. No. 748,024, Aug. 21, 1991, abandoned.

[30] Foreign Application Priority Data

| Aug. 22, 1990 | [JP] | Japan | 2-222004 |
| Aug. 24, 1990 | [JP] | Japan | 2-88602 U |
| Aug. 24, 1990 | [JP] | Japan | 2-223421 |
| Nov. 2, 1990 | [JP] | Japan | 2-297566 |

[51] Int. Cl.⁶ .................. G06F 13/00; G06F 12/00
[52] U.S. Cl. ..................... 395/200; 364/DIG. 1; 364/284; 364/252.3; 364/255.1; 364/259.8; 364/260.2; 364/260.4; 364/261
[58] Field of Search .................. 395/200, 400, 325

[56] References Cited

U.S. PATENT DOCUMENTS

| 4,403,282 | 9/1983 | Holberger et al. | |
| 4,543,627 | 9/1985 | Schwab | 364/DIG. 1 |
| 4,941,089 | 7/1990 | Fischer | 364/DIG. 1 |
| 5,054,020 | 10/1991 | Meagher | 370/48 |
| 5,077,655 | 12/1991 | Jinzaki | 395/200 |
| 5,093,780 | 3/1992 | Sunahara | |
| 5,175,732 | 12/1992 | Hendel et al. | 370/94.1 |
| 5,265,261 | 11/1993 | Rubin et al. | 395/200 |

FOREIGN PATENT DOCUMENTS

| 0242634 | 10/1987 | European Pat. Off. |
| 0321157 | 6/1989 | European Pat. Off. |
| 0366036 | 5/1990 | European Pat. Off. |
| 2109153 | 4/1990 | Japan |
| 2141270 | 12/1984 | United Kingdom |

*Primary Examiner*—Eddie P. Chan
*Attorney, Agent, or Firm*—Spensley Horn Jubas & Lubitz

[57] ABSTRACT

In communication control devices having a DMA transfer function and communication control systems for performing a data transmission between such communication control devices, it is desired to reduce time required for processing. In accordance with the present invention, a transmitted data is written in a receiving side memory by a write instruction from the transmitting side CPU. Alternatively, DMA controllers and receiver side memories are changed from one to another in response to a format representing the transmission information. Alternatively, write addresses in the receiver side memory are changed from one to another depending on the format of transmission information. Alternatively, DMA transfer to a buffer memory is controlled by an address counter. In such a manner, a procedure for transfer of data can be simplified.

4 Claims, 15 Drawing Sheets

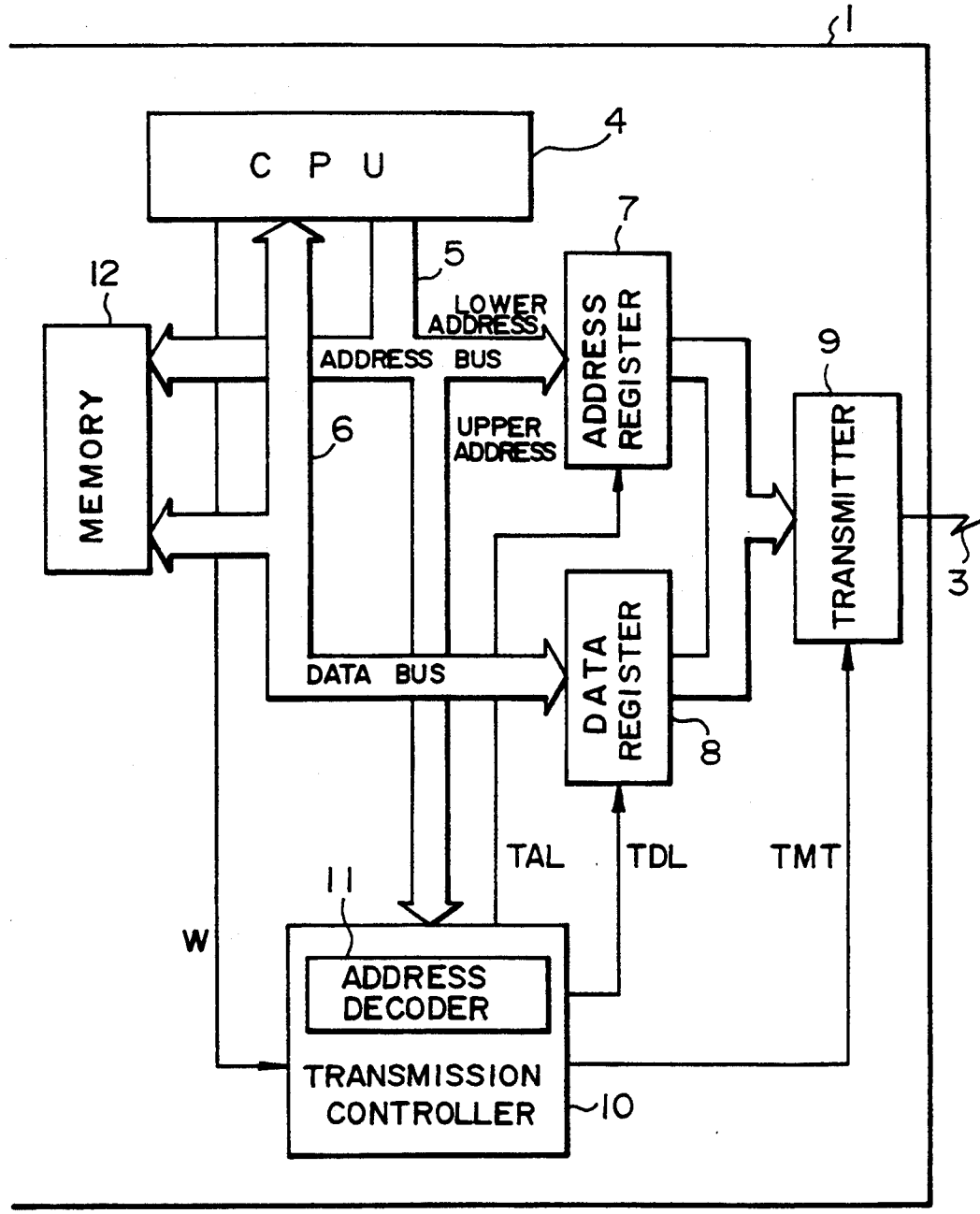

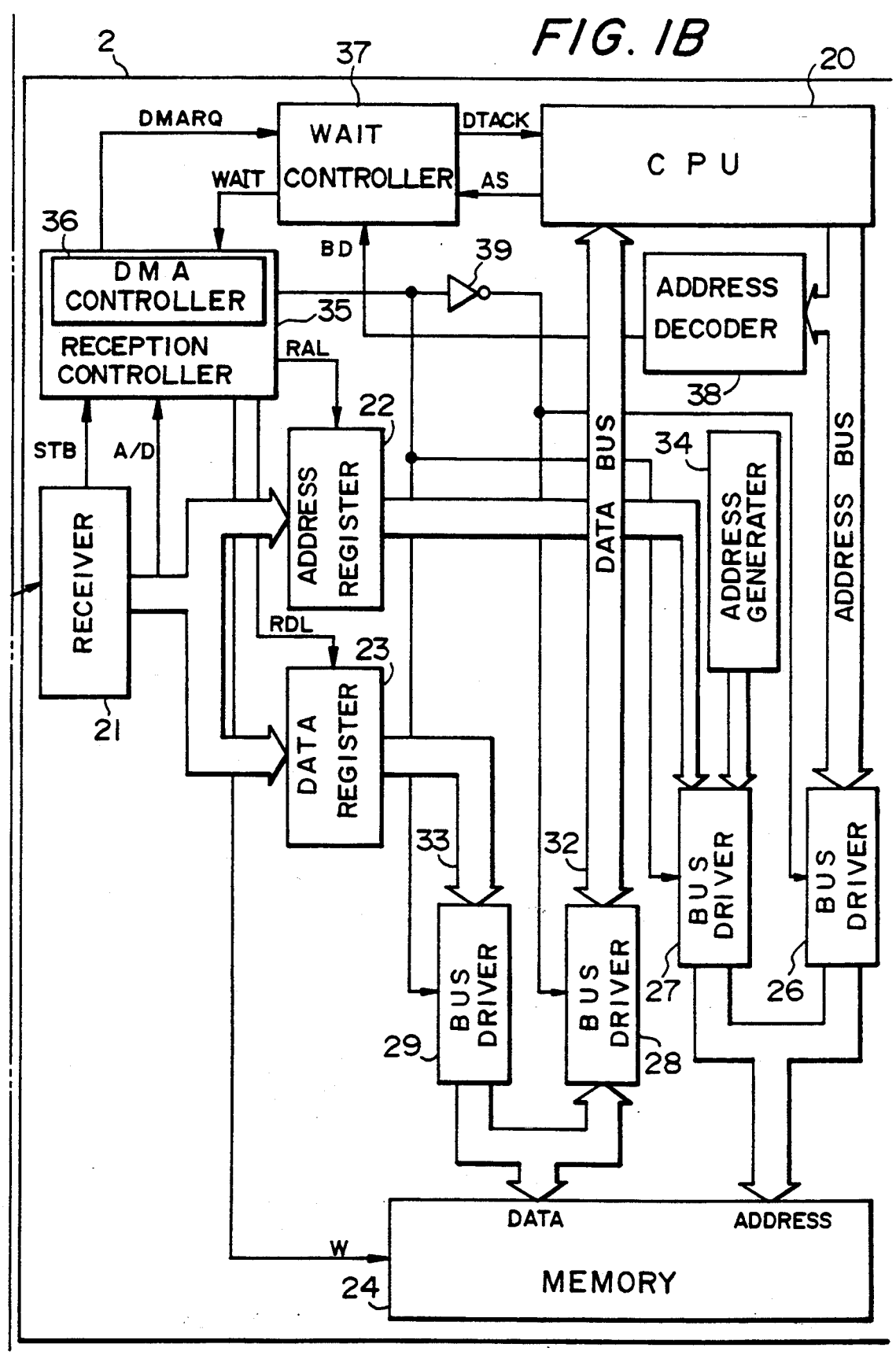

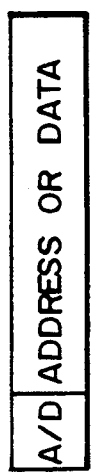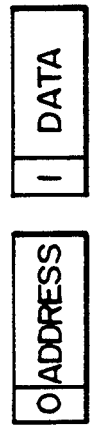
FIG. 5a
FIG. 5b
FIG. 5c

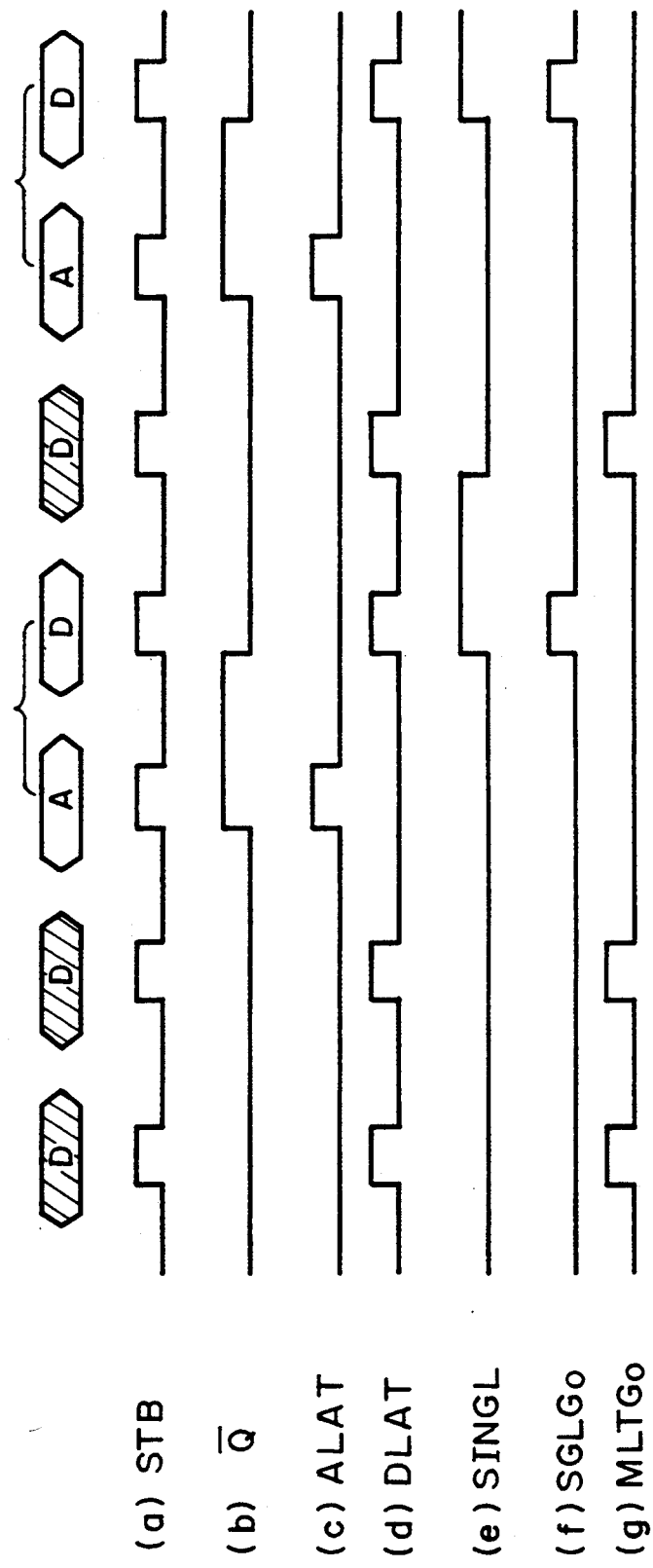

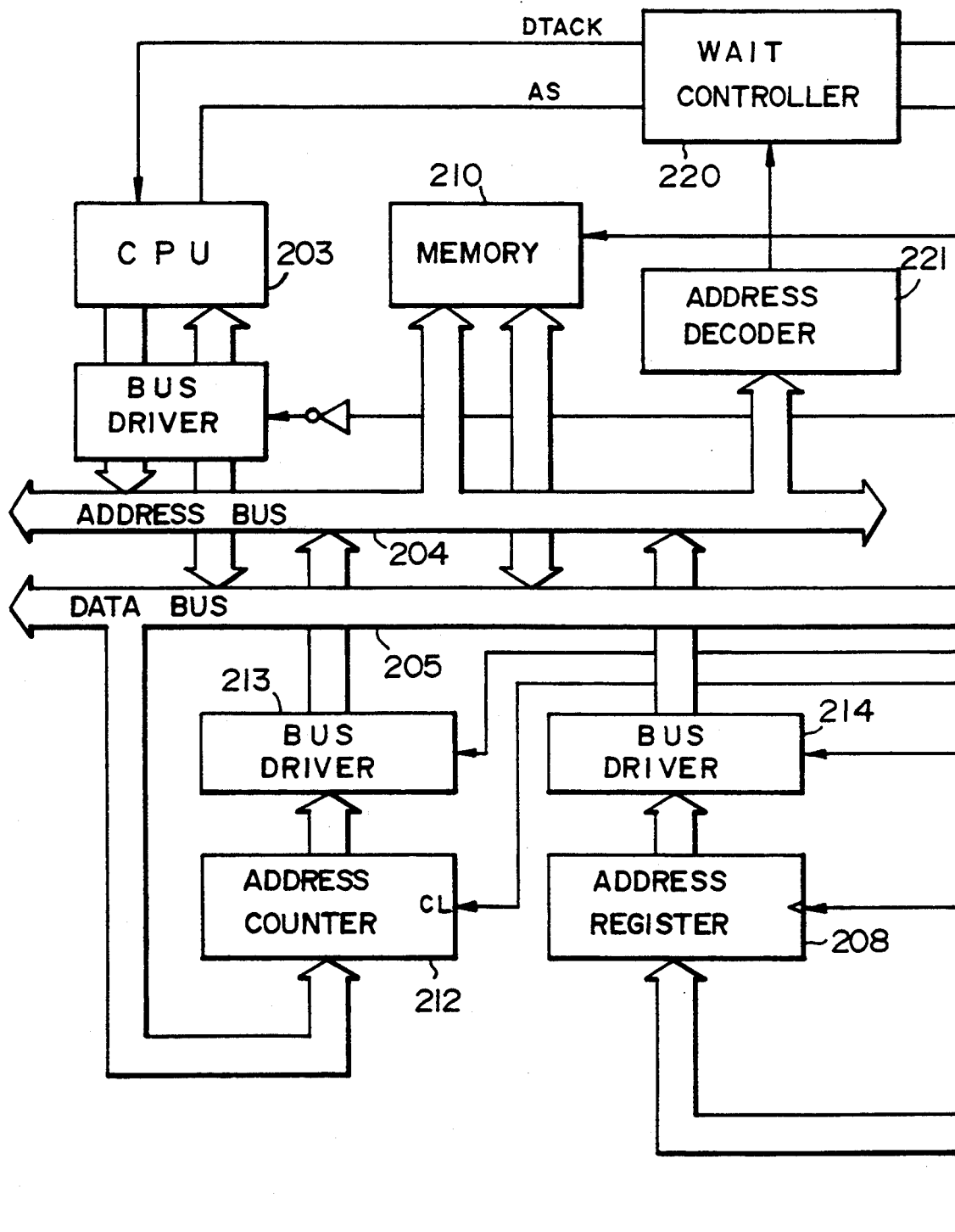

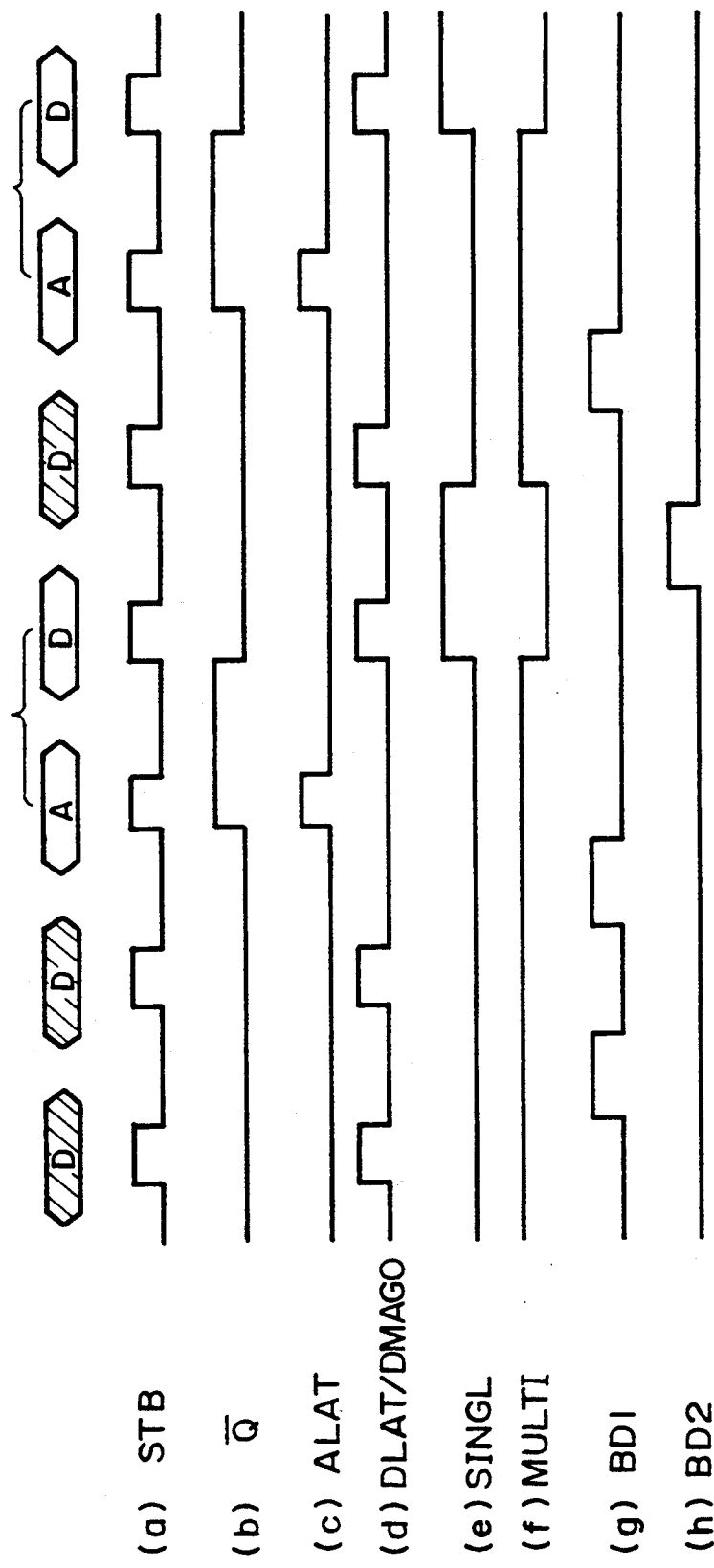

COMMUNICATION CONTROL SYSTEM FOR TRANSMITTING, FROM ONE DATA PROCESSING DEVICE TO ANOTHER, DATA ALONG WITH AN IDENTIFICATION OF THE ADDRESS AT WHICH THE DATA IS TO BE STORED UPON RECEPTION

This is a continuation of application Ser. No. 07/748,024 filed on Aug. 21, 1991, now abandoned.

BACKGROUND OF THE INVENTION

1. Field of the Invention

The present invention relates to a system for connecting one data processor such as a host computer with another data processor such as an extension sub-unit containing an I/O processor through a communication circuit such as an optical cable circuit and particularly to a data communication format usable in such a data communication system, a receiving side communication control depending on such a format and DMA transfer of data to the internal buffer means in the communication control system.

2. Description of the Related Art

In general, for data communication between two data processors, a DMA controller is provided in each of the transmission and receiving sides. Prior to transmission, the data processor on the transmission side first sets a source address, destination address, a data size and others. After the setting, the DMA controller is initiated to transmit data in a continuous manner.

On the other hand, the communication control unit on the receiving side includes a dedicated register for storing a start address, a data size and others necessary in the reception in addition to the DMA controller. Prior to reception, the dedicated register on the receiving side first sets the start address, data size and others. After the setting, the receiving side informs the transmission side that it is ready for reception and then initiates the DMA controller. After such a given procedure, the receiving side can actually receive data which are continuously sent from the transmission side.

The data thus received is always stored in a unique receive-only buffer in the communication control system on the receiving side.

Such a prior art system is effective for communication of a great volume of data, but unsuitable for transmission and reception of a small quantity of data since there is time required to perform the given procedure prior to the transmitting or receiving.

Since the received data is always stored in the unique receive-only buffer, information to be written in the other memory must be re-written in that memory after it has been once stored in the receive-only buffer. This requires unnecessary time and also another software for processing this procedure, the software being executed by the CPU in the communication control system.

DMA transfer generally utilizes two exclusive registers, that is, an address counter and a size counter. Prior to transfer, the start address and data size are set in the address and size counters, respectively. After the setting, a DMA controller will be started.

After having started, the DMA controller provides clock signals sequentially to the address and size counters and at the same time gives a read or write signal to the memory. Thus, the address counter will count up to specify the successive addresses in the memory sequentially. Data will be written into each of the specified addresses. On the other hand, the size counter counts down and generates an end signal when the contents in the size counter reache zero. When the end signal is received by the DMA controller, the latter terminates the DMA transfer.

However, such a DMA transfer technique requires two separate counters for address and data size. This increases the number of parts and renders the pre-transfer procedure complicated with more time required in the processing.

SUMMARY OF THE INVENTION

It is a primary object of the present invention to provide a communication control system which can simplify or eliminate the pre-transmission procedure and is suitable for communication of a small quantity of data.

The second object of the present invention is to provide a communication control system of the above type which can not only store the received data in a first memory which is a unique receive-only buffer, but also store them directly in the other or second memory and also to provide a communication system of the above type which can simplify or eliminate the pre-reception procedure to reduce the time required to perform the entire processing operation even if a small quantity of data is to be transmitted between the two memories.

The third object of the present invention is to implement a new communication control system which can simplify or eliminate the pre-reception procedure of the prior art communication system which is suitable for use in processing a great deal of data through the pre-reception procedure, thereby reducing the time required to make the entire processing operation.

The fourth object of the present invention is to reduce the number of parts for DMA transfer and also to realize a reduced processing time through a simplified pre-transfer procedure.

In order to accomplish these objects, the inventors propose a communication control system or apparatus which can take four basic arrangements as follows:

The first basic arrangement is a communication control system comprising:
A) a transmission side communication control device comprising:
 a) processing means for outputting an address and data on execution of a write instruction;
 b) a transmitter for transmitting inputted information; and
 c) transmission control means for inputting said address and data into the transmitter if said write instruction is one for the transmission area,
B) a receiving side communication control device comprising:
 d) a receiver for receiving said address and data from said transmitter;
 e) a memory for storing the data received by said receiver; and
 f) reception control means for addressing the memory to cause it to store said data, based on the address received by said receiver,
C) a communication cable connects the transmitter of the transmitter side communication control device with the receiver of the receiver side communication control device.

In such an arrangement, data is written into the memory of the receiving side communication control device in accordance with the write instruction from the processing means of the transmitter side communication control device. Only the execution of the write instruction to the transmitting area is required to execute the DMA operation. Therefore, there is no troublesome pre-procedure.

If the transmitter side communication control device includes a memory mounted therein, the transmitting area may be allocated to a portion of the address space for the processing means of the transmitting side communication control device, other than the address space portion in which the memory is mounted. In such a manner, the transmitted data is not written into the memory on the transmitter side. If only the low order bit of the address from the processing means is transmitted, the high order bit can be added to the low order bit on the receiver side, a combination of these bits being then written in the memory. Such a processing is particularly advantageous in bidirectional communication systems.

The second basic arrangement is a communication control device comprising:
A) a receiver for receiving information transmitted from a transmitter in a transmitter-side communication control device and an identification bit added thereinto on the basis of either of first or second format;
B) a first memory for storing a data in the information received by said receiver in response to an access;
C) a second memory for storing a data in the information received by said receiver in response to an access;
D) a first direct memory access control means accessible to the first memory;
E) a second direct memory access control means accessible to the second memory; and
F) selection control means for judging whether said information received by said receiver is on the basis of either the first or second format, based on the identification bit added to said information, said selection control means being adapted to initiate the first direct memory access control means if the information is on the basis of the first format and to start the second direct memory access control means if the information is on the basis of the second format.

When such a communication control device is applied to a communication control system, the latter will comprise:
A) a transmitter-side communication control device for transmitting information including identification bits added thereinto respectively on the basis of the first and second formats and comprising:
 a) processing means for outputting an address and data while generating a write instruction;
 b) a transmitter for transmitting information to be inputted;
 c) transmission control means for causing said address and data to input to the transmitter if said write instruction is one for a transmitting area and
 d) means for adding an identification bit to information to be transmitted by said transmitter,
B) a receiver-side communication control device comprising:
 e) a receiver for receiving the information transmitted from the transmitter in the transmitter-side communication control device;
 f) a first memory for storing a data in the information received by said receiver in response to an access;
 g) a second memory for storing a data in the information received by said receiver in response to an access;
 h) a first direct memory access control means accessible to the first memory;
 i) a second direct memory access control means accessible to the second memory; and
 j) selection control means for judging whether said information received by said receiver is on the basis of either the first or second format, based on the identification bit added to said information, said selection control means being adapted to initiate the first direct memory access control means if the information is on the basis of the first format and to start the second direct memory access control means if the information is on the basis of the second format.

In the second basic arrangement, any one of the first and second memories to be written will be selected depending on any selected one of the formats with which the information is transmitted. This operation is automatically performed directly against the memory without use of the communication controlling CPU.

The first and second formats may each be a format to which an identification bit representative of whether the information relating to each of the communication units is an address or data is added. In such a case, it is preferred that the first format takes the form of a format having a predetermined number of communication units while the second format is in the form of a format including communication units larger in number than those of the first format. Information relating to the foremost communication unit of the first format is an address. In such a manner, a memory to be written will be selected depending on whether or not the length of a message to be transmitted has a predetermined value. If the length of the message has a predetermined value, it is not required to perform any pre-reception procedure. Thus, data can be received by the receiver side rapidly.

The third basic arrangement is a communication control device comprising:
A) a receiver for receiving information transmitted from a transmitter of a transmission-side communication control device, said information including identification bits added thereinto on the basis of the first and second formats, the first format including a predetermined number of words, the forwardmost word being an address, the second format including the number of words more than those of the first format, each word being a data, each of all the words in the first and second formats including an identification bit used to identify whether information transmitted is an address or data;
B) a memory for storing only a data in the information received by said receiver;
C) direct memory access control means for controlling the writing of the received data into the memory;
D) an address counter wherein an address is to be set prior to the transmission of information from the transmission-side communication control device on the basis of the second format, the contents of said address counter being updated in response to a clock signal from the direct memory access control means;
E) control means for judging whether the information received by said receiver is on the basis of either the first or second format, based on the identification bit added to that information, said control means being adapted to initiate the direct memory access control means depending on the result of said judgment and at the same time adapted to provide the address included in the information received by the receiver to the memory if the information is on the basis of the first format and to deliver the contents of said address counter to the memory if the information is on the basis of the second format.

When such a communication control device is applied to a communication control system, the latter will comprise:

A) a transmitter-side communication control device for transmitting information including identification bits added thereinto on the basis of the first and second formats, the first format including a predetermined number of words, the forwardmost word being an address, the second format including the number of words more than those of the first format, each word being a data, each of all the words in the first and second formats including an identification bit used to identify whether information transmitted is an address or data, said transmitter-side communication control device comprising:
  a) processing means for outputting an address and data while generating a write instruction;
  b) a transmitter for transmitting information to be inputted;
  c) transmission control means for causing said address and data to input to the transmitter if said write instruction is one for a transmitting area and
  d) means for adding an identification bit to information to be transmitted by said transmitter,
B) a receiver-side communication control device comprising:
  e) a receiver for receiving the information transmitted from the transmitter in the transmitter-side communication control device;
  f) a memory for storing only a data in the information received by said receiver;
  g) direct memory access control means for controlling the writing of the received data into the memory;
  h) an address counter wherein an address is to be set prior to the transmission of information from the transmission-side communication control device on the basis of the second format, the contents of said address counter being updated in response to a clock signal from the direct memory access control means;
  i) control means for judging whether the information received by said receiver is on the basis of either the first or second format, based on the identification bit added to that information, said control means being adapted to initiate the direct memory access control means depending on the result of said judgment and at the same time adapted to provide the address included in the information received by the receiver to the memory if the information is on the basis of the first format and to deliver the contents of said address counter to the memory if the information is on the basis of the second format, and
C) a communication cable connecting between the receiver- and transmitter-side communication control devices.

In the third basic arrangement, the type of the format on which the information is transmitted performs the initiation of the DMA control means and the selection of any one of the received address and the address from the address counter. The received data will be stored in the memory through the procedure and process similar to the prior art for the second format and without any pre-reception procedure for the first format.

The fourth basic arrangement is a communication control system comprising:
A) a buffer memory for temporarily storing transmitted or received data;
B) direct memory access (DMA) control means for controlling the read or write of the transmitted or received data on the buffer memory, the DMA control means being adapted to output clock signals; and
C) an address counter for counting the clock signals, said address counter being adapted to generate a control signal when the counts reach a predetermined value, the control signal being used to terminate the operation of the DMA control means, the contents of the address counter addressing the buffer memory.

In the fourth basic arrangement, DMA transfer can be made only by setting an address corresponding to the size of data to be transferred in a single counter. Therefore, the number of counters can be reduced while at the same time the pre-transfer procedure can be simplified. The destination of the DMA transfer is the buffer memory. If the buffer memory has a capacity sufficient to store all the data relating to the transfer, no specific storage range is required to be specified. This will not create any obstruction.

BRIEF DESCRIPTION OF THE DRAWINGS

FIG. 1, comprising 1A and 1B, is a block diagram of the first embodiment of the present invention.

FIGS. 5a, 5b and 5c are view illustrating communication formats in the second embodiment.

FIG. 6 is a timing chart for various signals in the second embodiment.

FIG. 9 is a timing chart for various signals in the third embodiment.

Figure 2:
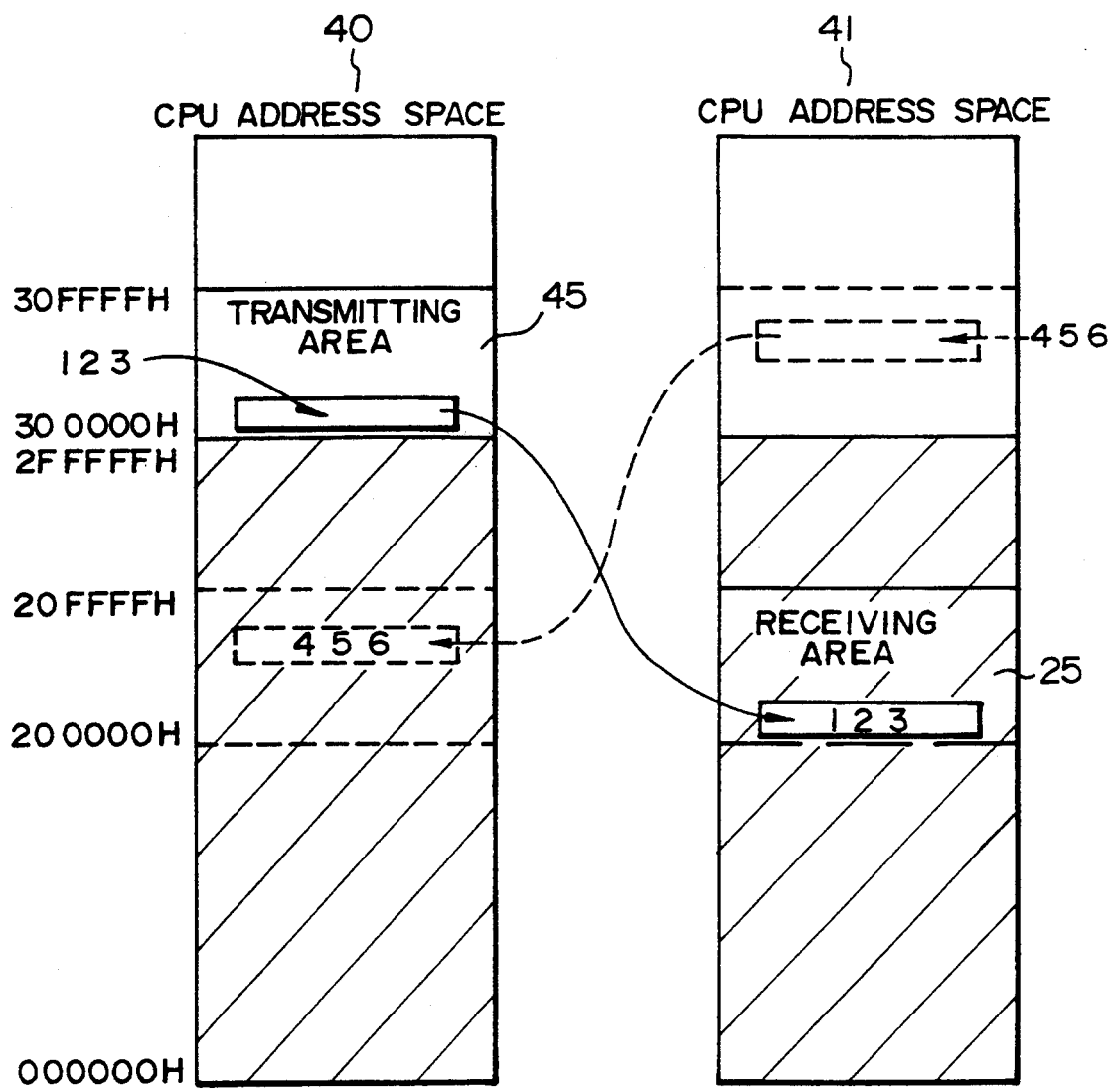
FIG. 2 is a view illustrating the allocation of CPU address space in the first embodiment.

DETAILED DESCRIPTION OF THE PREFERRED EMBODIMENTS (1) First Embodiment

Referring first to FIG. 1, there is shown the first embodiment of the present invention which comprises a communication control device 1 for a host unit, another communication control device 2 for a sub-unit and a communication cable 3 of optical fibers for connecting between these communication control devices.

For simplicity, only the transmitting side in the host unit and only the receiving side in the sub-unit are shown in FIG. 1. It is, however, to be understood that a bidirectional communication can be performed if the host unit has a receiving section and the sub-unit has a transmitting section.

The host unit side communication control device 1 comprises a communication controlling CPU 4 connected to an address bus 5 and a data bus 6; address and data registers 7 and 8 respectively connected to the address bus 5 and the data bus 6; a transmitter 9 connected to the address and data registers 7 and 8, the transmitter 9 including a parallel-serial converter and being adapted to transmit input information in serial to the receiving side through the communication cable 3; a transmission controller 10 including an address decoder 11 for decoding a n-th higher-order bit of n+m bits on the address bus 5, the transmission controller being adapted to control the address register 7, data register 8 and transmitter 9 in response to a write signal W from the CPU; and a memory 12 for storing various communication controlling data.

The sub-unit side communication control device comprises a communication controlling CPU 20; a receiver 21 for receiving information from the transmitter through the communication cable 3, the receiver 21 including a serial-parallel converter; address and data registers 22 and 23 for taking the address and data received by the receiver, respectively; a memory 24 for storing various communication controlling data, the memory 24 having a receiving area in which the received data is stored; bus drivers 26, 27, 28 and 29 inserted into address buses 30, 31 and data buses 32, 33, respectively; an address generator 34 for generating a n-th bit fixed address as a high-order address; a receiving controller 35 for controlling the address register 22, data register 23 and bus drivers 26–29, the controller 35 including a DMA controller 36; a wait controller 37 for making the intervention between the DMA and CPU; an address decoder 38 for decoding the address of the address bus 30 to discriminate whether or not the CPU accesses the memory 24; and an inverter 39.

Referring now to FIG. 2, there is shown a map showing the allocation of address space in the CPU in the present embodiment. This CPU map includes a host unit side address space section 40 and a sub-unit side address space section 41. The memories 12 and 24 are allocated respectively to the address space sections 40 and 41 of the CPU, as shown by hatched portions from an address 000000H to another address 2FFFFFH. The receiving area 25 on the sub-unit is allocated to the memory mounting space between 200000H and 20FFFFH. On the other hand, the transmitting area 45 on the host-unit is allocated to the address space having no memory mounted therein and shown between 300000H and 30FFFFH, different from the receiving area. However, the address spaces of the transmitting and receiving areas are equal to each other in magnitude.

More particularly, in the arrangement of FIG. 1, the address decoder 11 discriminates that the transmission area 45 is accessed by the CPU, when the address decoder 11 detects that the n-th high-order address bit is 30H. On this accessing, the transmission controller operates. The fixed address of n-th bit produced by the address generating circuit 34 is a high-order 20H representing the receiving area 25.

Figure 3:
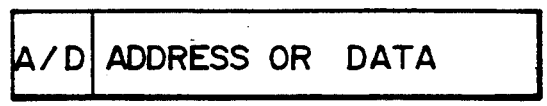
FIG. 3 is a view showing a communication format in the first embodiment.

As shown in FIG. 3, the communication format of the present embodiment includes a foremost bit which is an identification bit A/D used to discriminate whether the transmitted information is an address or data and the second and proceeding bits which are addresses or data.

The operation of the present embodiment will now be described.

It is first supposed that the host CPU 4 executes a write instruction to an address 300010H in the transmission area 45.

The address 300010H is then outputted onto the address bus 5 from the CPU 4 and a data to be transmitted is outputted onto the data bus 6. At the same time, the CPU 4 outputs a write signal W. If the address decoder 11 judges that the transmission area 45 is accessed by the CPU, the transmission controller 10 generates taking-in signals TAL and TDL respectively onto the address and data registers 7 and 8, in response to the write signal W.

Thus, a low-order address of m-th bit on the address bus 5 is latched into the address register 7 while a data on the data bus 6 is latched into the data register 8. In response to a transmission instruction TMT from the transmission controller 10, the transmitter 9 serially sends the address and data on the registers 7 and 8 to the sub-unit side through the communication cable 3 in accordance with the format shown in the FIG. 3.

At this time, the transmission area 45 is now allocated to an address space on which no memory is mounted. Therefore, any transmitted data will not be written in the memory 12.

On the other hand, the receiver 21 of the sub-unit converts the serially transmitted information into output parallel information for each word shown in FIG. 3 and at the same time provides a strobe signal STB to the receiving controller 35 for each output. Thus, the receiving controller 35 takes the identification bit A/D of the received information to discriminate whether this bit is "1" or "0". If this bit is "1", the receiving controller 35 judges that the identification bit is an address and then generates a taking-in signal RAL. If the bit is "0", the receiving controller 35 discriminates that the identification bit is a data and then produces a taking-in signal RDL. In such a manner, the address received by the receiver 21 is latched in the address register 22 while the data received by the receiver 21 is latched in the data register 23.

The DMA controller 36 in the receiving controller outputs a DMA request signal DMARQ to the wait controller 37. The wait controller 37 also receives an address strobe signal AS and a decoded output of the address decoder 38 in addition to the signal DMARQ. If any signal DMARQ is not inputted into the wait controller 37 on the access of the CPU 20 to the memory 24, the wait controller 37 returns a data ACK signal DTACK to the CPU such that the CPU 20 can access the memory 24 with non-wait. On DMA request, the wait controller 37 will not produce a wait signal WAIT if the memory 24 is not accessed by the CPU 20 on DMA request. Therefore, the DMA controller 36 can start the DMA promptly.

However, conflict in access may be between the CPU 20 and the DMA controller 36. To overcome this, the wait controller 37 is adapted to delay a timing at which the DTACK is returned to the CPU when the signal DMARQ is inputted into the wait controller 37 after the signal AS has been inputted thereinto and before the signal DTACK is returned to the CPU. This provides a wait to the CPU during which the DMA operation is performed. After the signal AS has been inputted into the wait controller 37 and when the signal DMARQ is inputted thereinto, the wait controller 37 generates a signal WAIT to the DMA controller 36 to place the DMA access in its stand-by state until the access of the CPU to the memory 24 terminates.

If the DMA is accepted by such a control, the DMA controller 36 shift a signal BD to "1" to open the bus drivers 27 and 29 and to close the bus drivers 26 and 28 such that the address bus 31 and the address generator 34 will be connected with the address terminal of the memory 24 while at the same time the data bus 33 will be connected with the data terminal of the memory 24. Simultaneously, the write signal W is supplied to the memory 24. In such a manner, the address terminal of the memory 24 will receives the n-th bit from the address generator 34 in the higher-order location of the memory and the m-th bit from the address register 22 at the lower-order location of the memory. For example, if the m-th bit is 0010H, the received data will be written into the receiving area 25 of the memory at an address 200010H.

In such a manner, the data communication can be performed only by executing the write instruction to the transmission area.

It is of course to be understood that if the host unit has a receiving section similar to that of the sub-unit and the sub-unit has a transmitting section similar to that of the host unit, a bidirectional communication can be made as shown by broken line in FIG. 2.

Although the first embodiment has been described as to perform the DMA by providing a wait to the CPU, the conventional process of providing a hold request to the CPU and executing the DMA in response to the hold ACK from the CPU may be used similarly in the present embodiment. In such a case, the bus drivers 26 and 28 will be omitted.

The first embodiment aforementioned can reduce time required to make the transmission of a small quantity of data and the entire processing operation to realize a high-speed data communication since the pre-transmission procedure can be very simplified in accordance with the present embodiment.

(2) Second Embodiment

Figures 4, 4A, 4B:
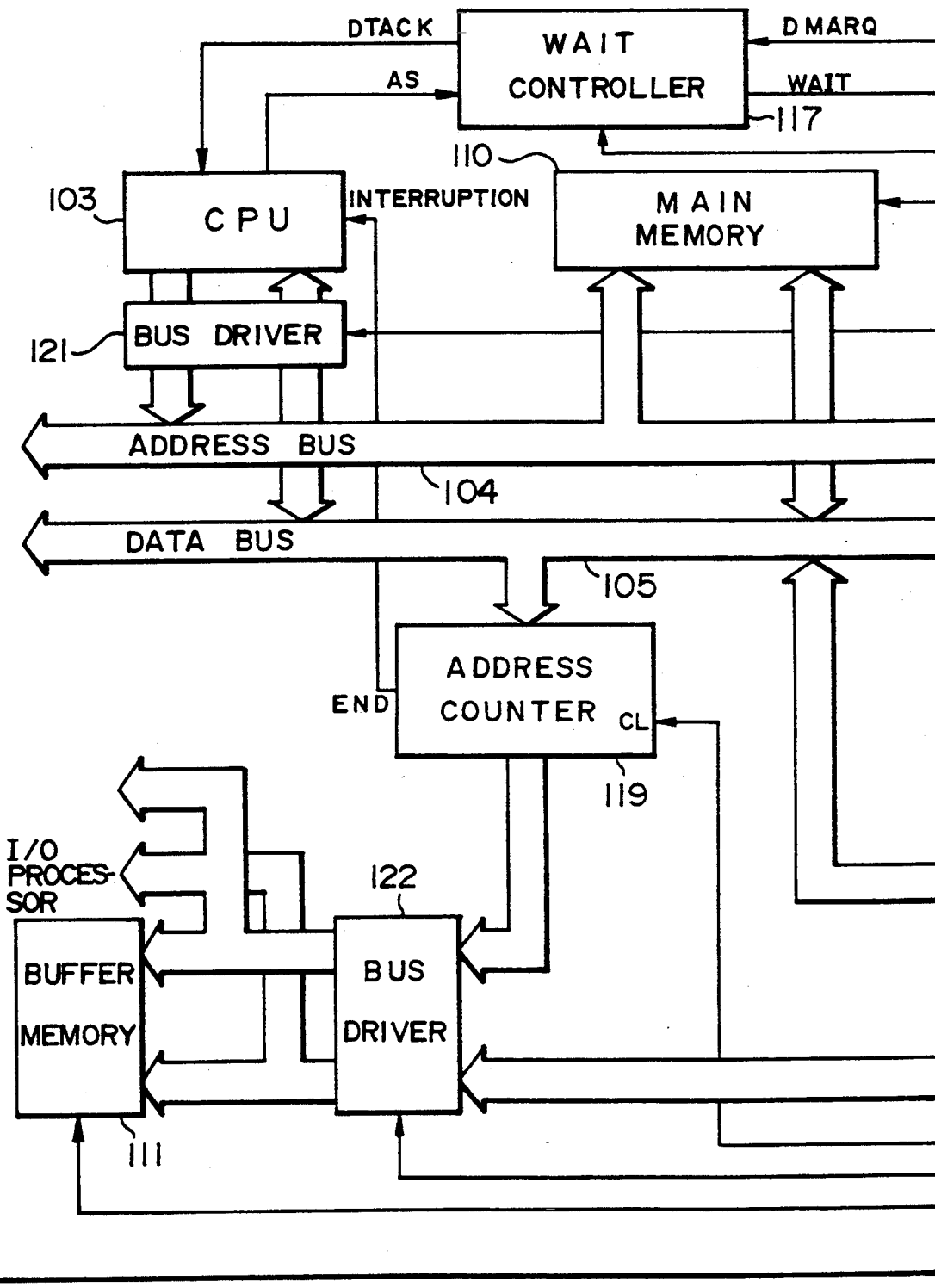
FIG. 4, comprising 4A and 4B, is a block diagram of the second embodiment of the present invention.
Figure 4B:
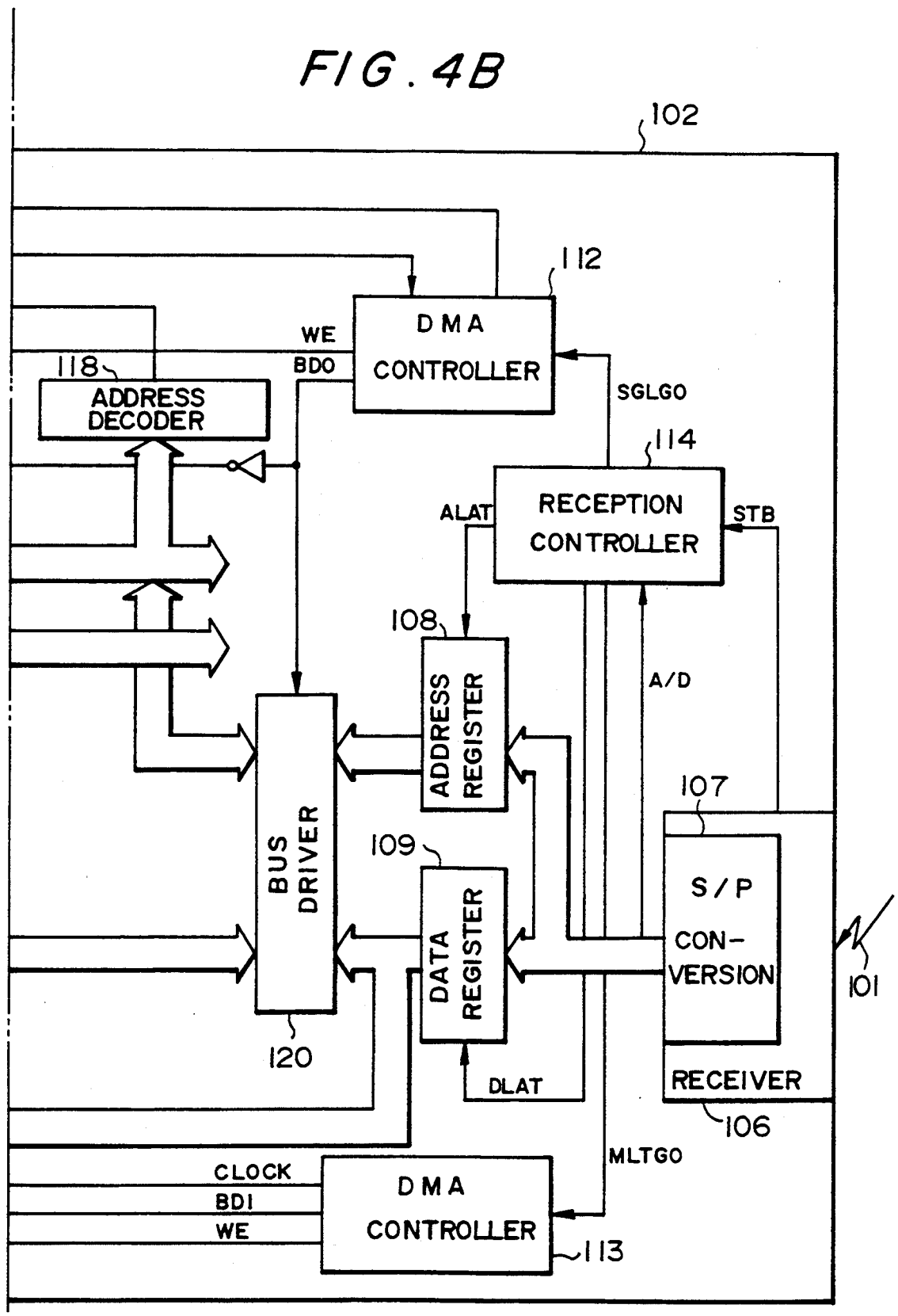
Figure 13:
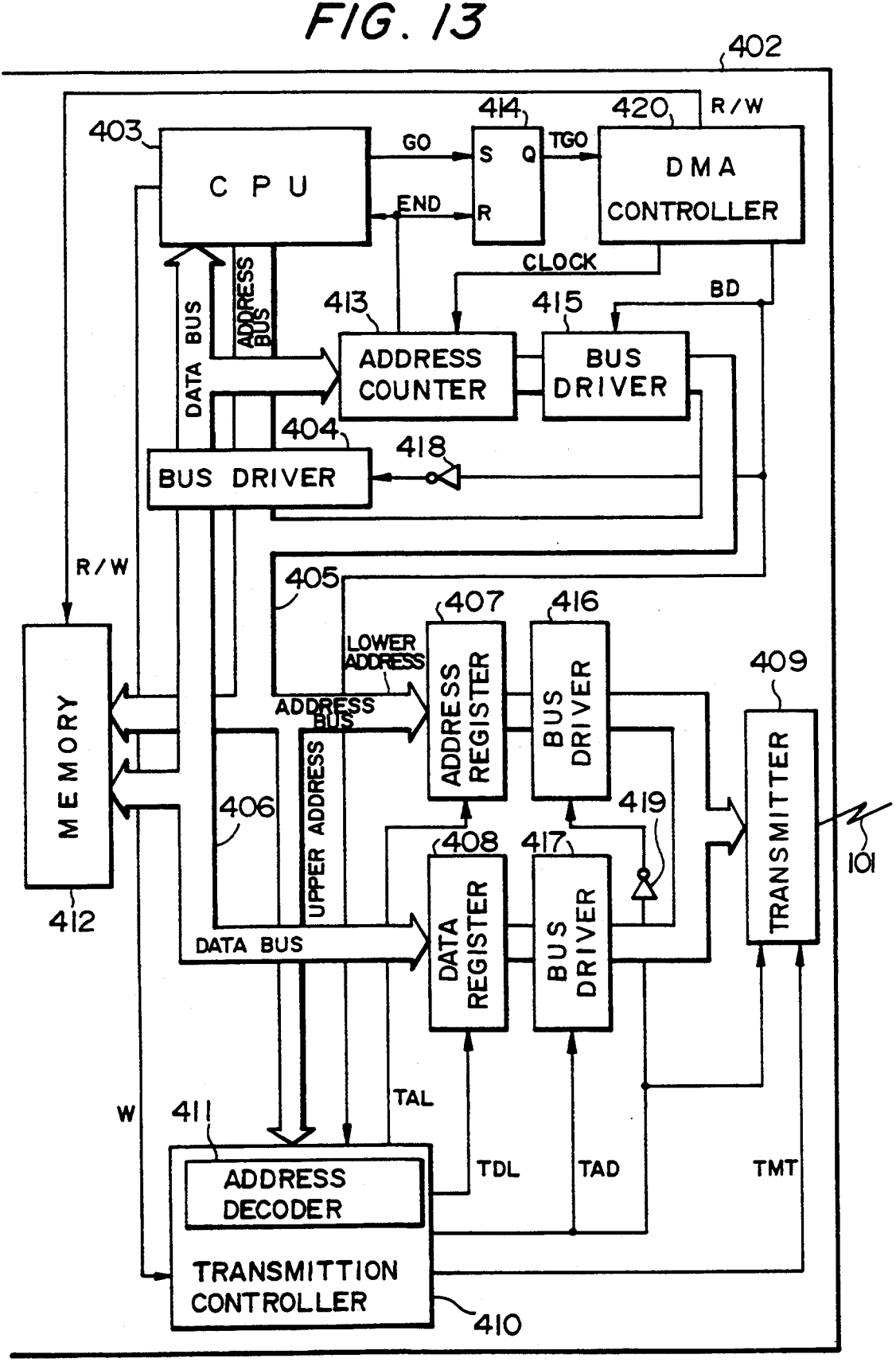
FIG. 13 is a block diagram of the transmission-side arrangement of the second embodiment of the present invention.

FIGS. 4 and 13 are block diagrams of the second embodiment of the present invention. The second embodiment is on the assumption that it is a transmitter-side communication control device including components similar to those of the first embodiment.

The second embodiment comprises a host-unit communication control device 402 constructed in such a manner as shown in FIG. 13. The host-unit communication control device 402 is connected to a sub-unit through a communication cable 101 of optical fibers. The host-unit communication control device 402 comprises a communication control CPU 403 connected to an address bus 405 and a data bus 406, and address and data registers 407 and 408 respectively connected to the address and data buses 405, 406. The host-unit communication control device 402 further comprises a transmitter 409 including a parallel-to-serial converter connected to the address and data registers 407 and 408 and adapted to transmit information to the receiver side in serial through the communication cable 101, a transmission controller 410 including an address decoder 411 for decoding the upper order bits of n in number in n+m bits of the address bus 405, said transmission controller 410 being adapted to control the address register 407, the data register 408, the transmitter 409 and bus drivers 416, 417 in response to a write signal W from CPU 403, and a memory 412 for storing various data used to control the communication.

The host-unit communication control device 402 further comprises a DMA controller 420 for controlling DMA transfer to the memory 412, an address counter 413 for addressing the memory 412 on the DMA operation, a flip flop 414 for generating a start signal TGO in response to a signal GO from the CPU 403, bus drivers 404, 415, 416 and 417 and inverters 418 and 419.

On the other hand, FIG. 4 shows a sub-unit communication control device which comprises a communication circuit 101 of optical fibers and a sub-unit side communication control device 102 for receiving information from a host unit side communication control device through the communication circuit 101. For example, this sub-unit may comprise an I/O processor for providing a plurality of extension terminal equipment in addition to the communication control device 102.

Referring again to FIG. 4, the communication control device 102 comprises a communication controlling CPU 103; address and data buses 104 and 105; a receiver 106 for receiving information transmitted through the communication circuit 101, the receiver including a serial-parallel converter 107; address and data registers 108 and 109 for taking address and data received by the receiver; a main memory 110 connected to the address and data buses 104 and 105 for storing various communication controlling data and a portion of the received data; a buffer memory 111 dedicated to store the received data, the buffer memory being separated from the address and data buses 104 and 105 and the main memory 110; DMA controllers 112 and 113 for controlling the writing of the received data into the respective one of the main memory 110 and buffer memory 111; and a receiving controller 114 for controlling the taking of the information into the address and data registers 108 and 109 in response to the signal from the receiver 106 while at the same time selectively initiating the DMA controllers 112 and 113.

The communication control device 102 further comprises a wait controller 117 for performing the intervention between the DMA operation of the DMA controller 112 and the access of the CPU 103 to the main memory; an address decoder for decoding the address of the address bus (104) to judge whether or not the main memory 110 is accessed by the CPU; an address counter 119 for specifying an address in the buffer memory 111 on the DMA operation of the DMA controller 113; and bus drivers 120, 121 and 122 respectively inserted into the address and data buses, the opening and closing of these buses being controlled respectively by the DMA controllers 112 and 113.

A start address is set at the address counter 119 before data transmission. In response to clock signals CLOCK from the DMA controller 113, the address counter 119 counts up and generates an end signal END at its output as the contents of the address counter 119 reaches all "0" starting from all "1". This end signal is an interruption signal which informs the CPU 103 of the termination of the DMA. In other words, the address counter 119 serves also as a size counter. Thus, the address counter 119 may be replaced by a conventional address counter and a size counter.

Communication formats usable in the present embodiment will now be described with reference to FIG. 5.

As shown in FIG. 5 (a), the present embodiment utilizes, as a communication unit, one-word information in which an identification bit A/D for identifying whether the transmitted information is an address or data is added into the transmitted information consisting of an address or data.

When it is wanted to transmit a single word, the transmission information will be formed at the foremost end of a data word to be transmitted, as shown in FIG. 5 (b). When it is desired to perform the multi-word transmission, the transmission information will be formed only by data.

The operation of the second embodiment will now be described in detail with reference to FIGS. 6 and 7.

In order to clarify the operation, it is assumed herein that the single-word transmission as shown in FIG. 5 (b) is carried out during and after the multi-word transmission with such a format as shown in FIG. 5 (c).

Namely, information shown by hatching in FIG. 6 is information transmitted in the multi-word transmission. Paired information shown by "{" in FIG. 6 is information transmitted by the single-word transmission.

The memory 412 of the host-unit communication control device shown in FIG. 13 is assigned by addresses 200000H-20FFFFH from the address space in the CPU 403, as shown in FIG. 2. The receiving area in the sub-unit is allocated to 0000000H-2FFFFFH. When the CPU 403 writes an address in the transmitting area, the address decoder 411 decodes the upper order bit thereof. The CPU 403 then generates a write signal W. In response to the signal W, the transmission controller 410 feeds signal TAL and TDL to the respective address registers 407 and 408 and latches address (lower order bit) and data on the address and data buses 405 and 406. The transmission controller 410 provides a signal TAD to the bus drivers 416 and 417 and further causes the transmitter 409 to perform the transmission.

With the multi-word transmission, a start address is set at the address counter 413 which is an up-counter of 16 bits. The address counter 413 provides 15 bits except the most significant bit to the memory 412. The most significant bit is applied to the reset terminal of the flip flop 414 and the interrupt terminal of the CPU 403 as signal END.

When the address counter 413 is counted up starting from the start address, the most significant address is attained in the memory 412 to output a signal END.

On initiation of the transmission, it is on the assumption that data has been stored in the memory 412. The data stored in the memory 412 is addressed by the counts of the address counter 413. Namely, the CPU 403 generates a signal GO to initiate the DMA controller 420. In response to a signal TGO generated by the flip flop 414 in response to the signal GO, the DMA controller 420 makes a signal BD "1" to open the bus driver 415. At the same time, a signal R/W is made "0" to perform the reading against the memory 412. The transmission controller 410 outputs a signal TDL in response to the signal BD from the DMA controller 420. This signal TDL is changed from "0" to "1" in response to the input of the write signal W and also becomes "1" in response to the input of the signal BD. The transmitter 409 adds an identification bit to the information to be transmitted, depending on the value of the signal TAD. As the address counter 413 counts up, the signal END therefrom turns the signal TGO off. As a result, the DMA controller 420 will be terminated.

The sub-unit communication control device 102 executes its receiving operation as follows:

After a start address has been set at the address counter 119 prior to transmission and when the multi-word transmission is initiated, one-word information transmitted is sequentially received by the receiver 106 through the communication circuit 101. The receiver 106 causes the serial-parallel converting circuit 107 to convert the single-word information serially received by the receiver 106 into a form of parallel information. For each output, the receiver 106 also provides a strobe signal STB to the receiving controller 114.

Figure 7:
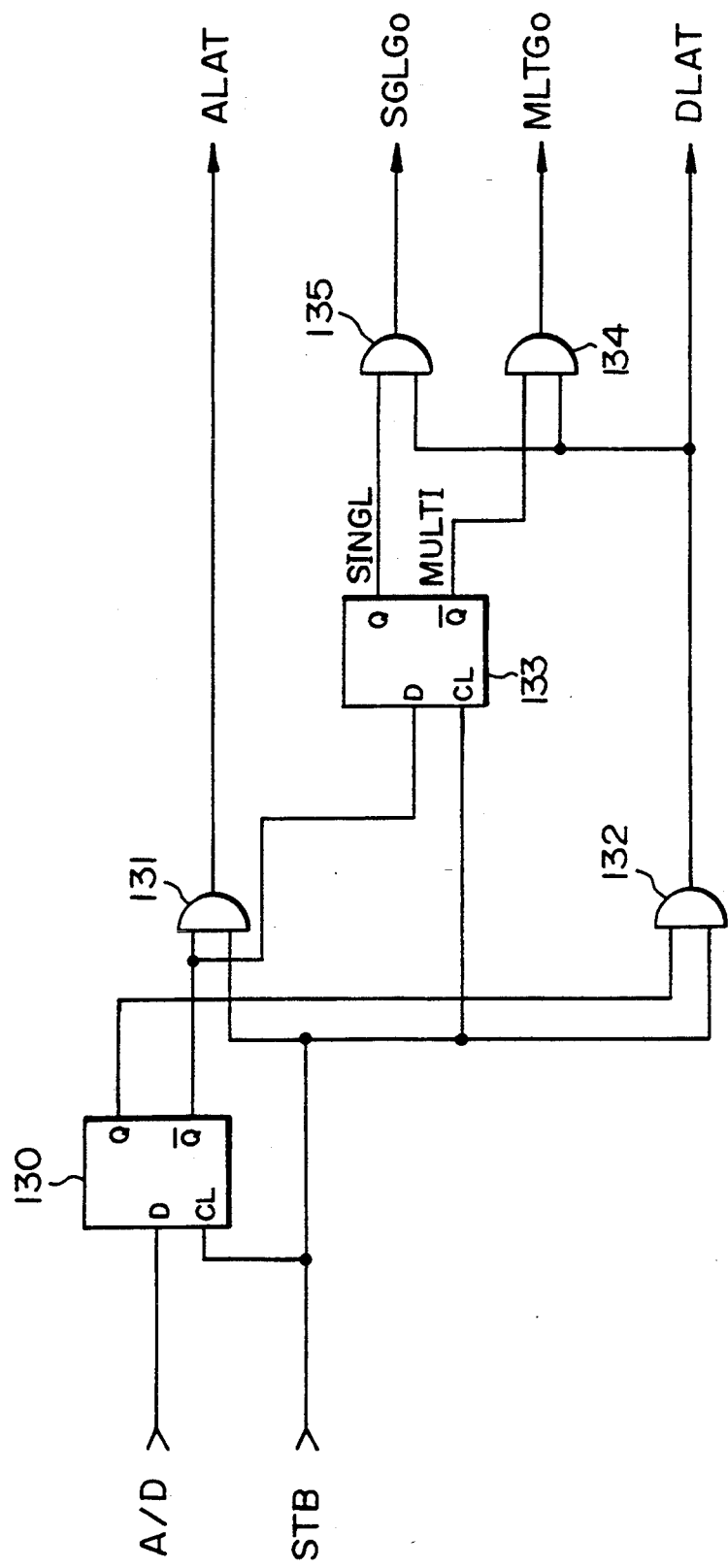
FIG. 7 is a circuit diagram of a receiving controller in the second embodiment.

As shown clearly in FIG. 7, the receiving controller 114 comprises a D type flip flop 130 including a D terminal for receiving the identification bit A/D which is the output of the receiver 106 and a CL terminal for receiving the strobe signal STB; an AND gate 131 for receiving the inverted Q output of the D type flip flop 130 and the strobe signal STB; another AND gate 132 for receiving the Q output of the D type flip flop 130 and the strobe signal STB; another D type flip flop 133 including a D terminal for receiving the inverted Q output of the D type flip flop 130 and a CL terminal for receiving the strobe signal STB; and AND gates 134 and 135 each having one terminal for receiving the output of the AND gate 132 and the other terminal for receiving the inverted Q or Q output of the D type flip flop 133.

If the received information is an address, the identification bit A/D becomes "0". Thus, the D type flip flop 130 is set to cause the AND gate 131 to output a signal ALAT, as shown in FIG. 6 (c). If the received information is a data, the identification bit A/D is "1". The D type flip flop 130 is reset to cause the AND gate 132 to output a signal DLAT, as shown in FIG. 6 (d). As a result, an address and data received by the receiver 106 are latched in the address and data registers 108 and 109, respectively.

If a signal STB enters after the inverted Q output of the D type flip flop 130 has been "1", the D type flip flop 133 is set to make a signal SINGK "1", as shown in FIG. 6 (e). If the receiver receives an address word followed by a data word in the single-word communication, therefore, the AND gate 135 will generate a start signal SGLGO, as shown in FIG. 6 (f). On the other hand, the AND gate 134 has receive an inverted signal MULTI from the D type flip flop 133. As shown in FIG. 6 (g), thus, a signal MLTGO will be outputted only when the data word enters the receiver in the multi-word communication.

When the DMA controller 113 is started by the signal MLTGO, the DMA controller 113 makes a signal BD1 "1" to open the bus driver 122 such that the outputs of the address counter 119 and data register 109 are connected with the address and data terminals of the buffer memory 111, respectively. At the same time, a write signal WE is given to the buffer memory 111. Therefore, the received data is written at a position corresponding to the start address of the memory 111. After the writing, the DMA controller 113 generates one signal CLOCK to cause the address counter 119 to count up.

Consequently, the first, second and fifth data words of FIG. 6 in the multi-word transmission will be sequentially stored at the successive addresses in the buffer memory 111.

On the other hand, when the DMA controller 112 is started by the signal SGLGO, the DMA controller 112 outputs a DMA request signal DMARQ to the wait controller 117. The wait controller 117 then performs the intervention between the CPU and the DMA controller, as aforementioned. If DMA is permitted, the DMA controller 112 makes a signal BD0 "1" and also provides the write signal WE to the main memory 110. Thus, the bus driver 120 is opened while the bus driver 121 is closed. As a result, the address and data registers 108 and 109 are connected to the address and data buses 104 and 105. The main memory 110 is addressed by the receiving address at which the received data is written.

Consequently, the fourth and seventh data words of FIG. 6 in the single-word transmission will be stored in the storage locations of the main memory 110 which have been just now addressed.

In such a manner, the received data will be automatically stored in any one of various different memories, depending on the communication format. It can be thus said that the identification bit A/D is information indicating in which memories the received data is to be stored.

The arrangement of this embodiment in which a destination memory can be selected depending on the communication format can be utilized, for example, such that information required in the operation of the CPU 103 is processed by the single-word communication while information required in any processor (not shown) is processed by the multi-word communication.

If the main memory 110 has a relatively large capacity, an address to be transmitted may be only a low-order address, as in the first embodiment. An address generating circuit for generating a high-order address (see FIG. 1 at 34) may be added to the receiver side so as to address the main memory by these low- and high-order addresses.

As described in connection with the first embodiment, the conventional well-known method may be taken in which a hold request may be provided to the CPU to perform the DMA in response to a hold ACK from the CPU.

Although the second embodiment has been described as to one word, the number of words may be suitably selected, if desired.

In accordance with the second embodiment, the received data can be automatically stored directly in any memory other than the dedicated receive buffer. This can reduce time required to store data in the other memories.

(3) Third Embodiment

Figure 8B:
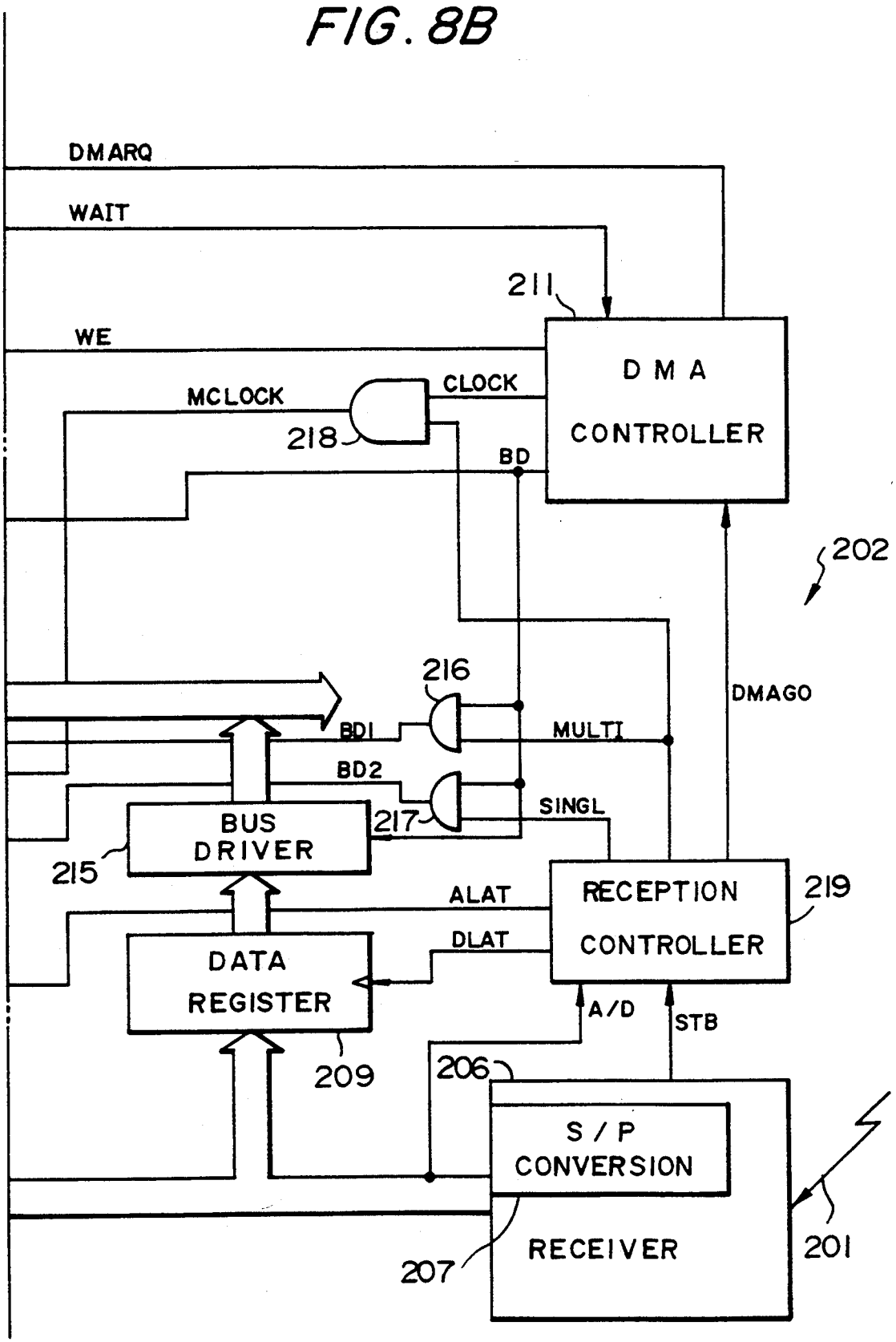
FIG. 8, comprising 8A and 8B, is a block diagram of the third embodiment of the present invention.

FIG. 8 shows a block diagram of the third embodiment of the present invention. The third embodiment is on the assumption that it is a transmitter-side communication control device as in the first or second embodiment. However, the third embodiment does not utilize such a buffer memory as in the second embodiment. Therefore, the third embodiment will be described only in connection with the arrangement and operation of the receiver-side communication control device.

The third embodiment comprises a communication circuit 201 of optical fibers and a sub-unit side communication control device 202 for receiving information from a host unit side communication control device (not shown) through the communication circuit 201. For example, this sub-unit may comprise an I/O processor for providing a plurality of extension terminal equipment in addition to the communication control device 202.

Referring again to FIG. 8, the communication control device 202 comprises a communication controlling CPU 203; address and data buses 204 and 205; a receiver 206 for receiving information transmitted through the communication circuit 201, the receiver including a serial-parallel converter 207; address and data registers 208 and 209 for taking address and data received by the receiver; a memory 210 connected to the address and data buses 204 and 205 for storing the received data; a DMA controller 211 for controlling the writing of the received data into the memory 210; an address counter 212 for addressing the memory 210 in the DMA operation of the DMA controller 211; bus drivers 213, 214, 215 and 222 respectively inserted into the address and data buses and adapted to be opened and closed depending on the outputs of the DMA controller 211 or AND gates 216 and 217; and an AND gate 218.

The communication control device 201 also comprises a receiving controller 219 for controlling the taking of information into the address and data registers 208 and 209 in response to a signal from the receiver 206 and also for controlling the start of the DMA controller 211 and the opening and closing of the bus drivers 213 and 214; a wait controller 220 for performing the intervention between the DMA operation of the DMA controller 211 and the access of the CPU 203 to the memory; and an address decoder 221 for decoding the address of the address bus 204 to discriminate whether or not the memory 210 is accessed by the CPU.

The wait controller 220 and address counter 212 will be described in more details.

The wait controller 220 receives a DMA request signal DMARQ from the DMA controller 211, an address strobe signal AS from the CPU 203 and a decoded output from the address decoder 221. When the CPU 203 accesses to the memory 210 and if the signal DMARQ has been inputted, a data ACK signal DTACK is returned back to the CPU 203 with a predetermined timing such that the access of the CPU 203 is performed with no-wait. If the CPU 203 does not access to the memory 203, no wait signal WAIT will be generated. Thus, the DMA controller 211 can immediately initiate its DMA operation.

However, there may be a conflict between the CPU 203 and the DMA controller 211 on accessing. In order to overcome such a conflict, the CPU may be waited by delaying the timing at which the signal DTACK should be returned back to the CPU, if the signal DMARQ is inputted into the CPU after the input of the signal AS and before the return of the signal DTACK back to the CPU. During the waiting, DMA operation is performed. If the signal DMARQ is inputted into the CPU after the signal DTACK has been returned back to the CPU after the input of the signal AS, a wait signal WAIT is provided to the DMA controller 211 such that the DMA access will be delayed until the access of the CPU to the memory 210 is terminated.

Prior to the transmission of data, a start address is set at the address counter 212. The address counter 212 is responsive to clock signals CLOCK from the AND gate 218 to count up. As the contents of the counter becomes all "0" from all "1", a finish signal END is outputted from the address counter, by which the termination of the DMA operation is informed to the CPU 203 through interruption. In other words, the address counter 212 also serves as a size counter. Alternatively, thus, the address counter 212 may be replaced by a combination of an address counter with a size counter.

Communication formats usable in the present embodiment are similar to those of FIG. 5.

As shown in FIG. 9(a), this embodiment uses, as a communication unit, one-word transmitted information consisting of an address or data which includes an identification bit A/D used to judge whether the information is an address or data.

On transmission of a single-word data, as shown in FIG. 9(b), information to be transmitted is formed with a format having an address word which is placed on the forwardmost word to be transmitted. On transmission of a multi-word data, the format is defined to form information to be transmitted only by data, as shown in FIG. 9(c).

The operation of the second embodiment will now be described in detail with reference to FIGS. 9 and 10.

In order to clarify the operation, it will be described in connection with an arrangement similar to that of the second embodiment.

Prior to the transmission, the setting of a start address to the address counter 212, the initiation of the multi-word communication and the reception of transmitted one-word information by the receiver 206 are executed, as in the second embodiment. The receiver 206 performs the serial-parallel conversion output and the output of a strobe signal STB to the receiving controller 219.

Figure 10:
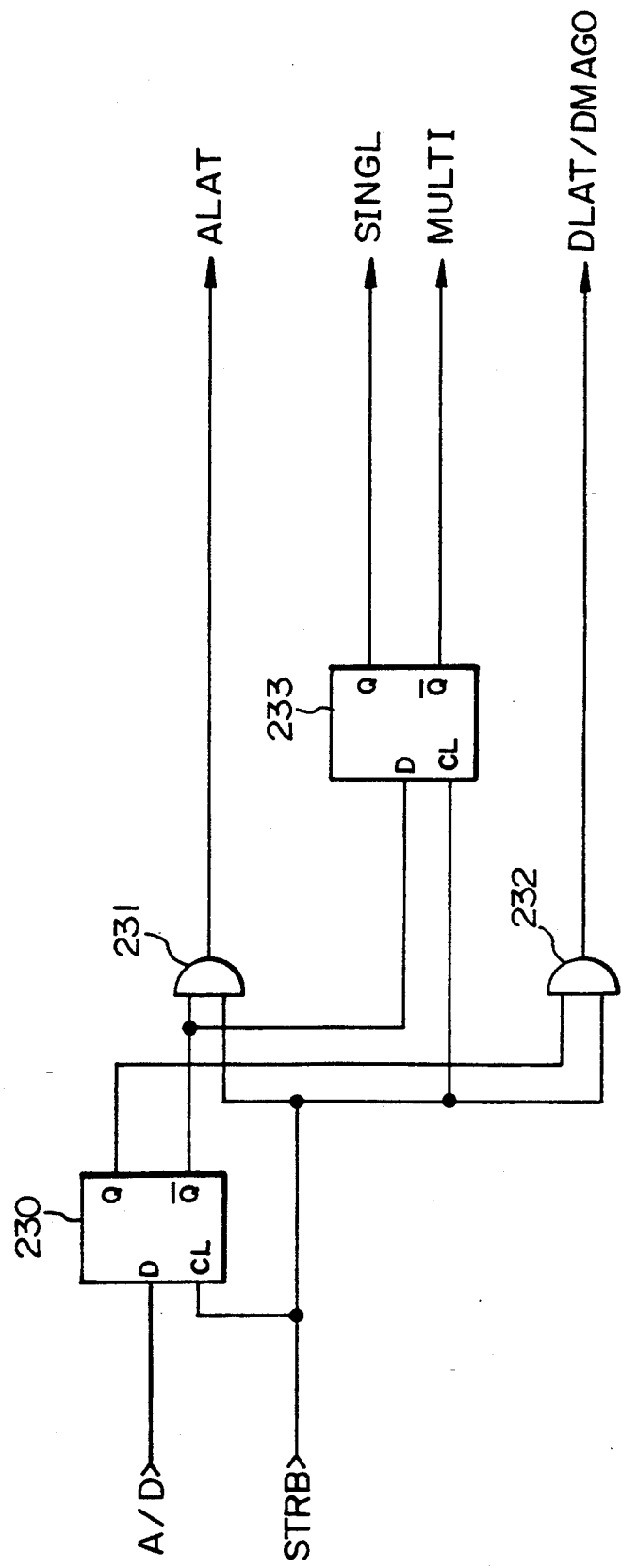
FIG. 10 is a circuit diagram of a receiving controller in the third embodiment.

As shown clearly in FIG. 10, the receiving controller 219 comprises a D-type flip flop 230, an AND gate 231 and a D-type flip flop 233, as in the second embodiment. However, the receiving controller 219 does not include components corresponding to the D-type flip flop 33 and AND gates 34 and 35 which are shown in FIG. 7.

As in the second embodiment, therefore, the D-type flip flop 230 is reset and a signal ALAT is outputted from the AND gate 231 since the identification bit A/D is "0" if the information received is an address, as shown in FIG. 10(c). If the information received is a data, the identification bit A/D is "1". As a result, the D-type flip flop 230 is set and a signal DLAT is outputted from the AND gate 232, as shown in FIG. 10(d). Thus, the address and data received by the receiver 206 are respectively latched in the address and data registers 208 and 209. Since the signal DLAT becomes a start signal DMAGO to the DMA controller 211, the DMA controller 211 will be started each time when the data is latched.

After the inverted Q output of the D type flip flop 230 has been "1" and if a signal STB is inputted into this flip flop, the D type flip flop 233 is set to make a signal SINGL from "0" to "1" only during one cycle of the signal STB, as shown in FIG. 9 (e) and to make a signal MULTI from "1" to "0", as shown in FIG. 10 (f).

As the DMA controller 211 is started by a signal DMAGO, the MDA controller 212 outputs a DMA request signal DMARQ to the wait controller 220. As aforementioned, the wait controller 220 performs the intervention between the CPU and the DMA controller. If DMA is permitted, the DMA controller 211 makes a signal BD "1" and provides a write signal WE to the memory 211. After the writing, the DMA controller 213 generates one signal CLOCK to cause the address counter 219 to count up. Since the signal BD is inputted directly into the bus driver 215, the output of the data register 209 is connected to the data terminal of memory 210 through the data bus 205. Since the inverted signal of the signal BD is inputted into the bus driver 222, the bus driver 222 is closed and the CPU 203 is disconnected to the memory 210, during the DMA operation.

However, the clock signal and the signal BD are not inputted directly into the bus driver 213 and address counter 212. Instead, the bus driver and address counter receive the output of the AND gates 216 and 218 which receives, at one end, a signal MULTI. Only on the multi-word communication, therefore, the bus driver 213 is opened as shown in FIG. 9 (g). The address terminal of the memory 210 receives an address from the address counter 212 which counts up only in this case.

Therefore, the first, second and fifth data words of FIG. 9 will be sequentially stored in the successive addresses starting from the start address in the memory 211.

On the other hand, since the bus driver 214 receives the output of the AND gate 217 which receives signals BD and SINGL, the bus driver 214 is opened only on the single-word communication as shown in FIG. 9 (h). An address will be supplied from the address register 208 to the address terminal of the memory 210.

Therefore, the fourth and seventh data words of FIG. 9 will be stored in the storage locations of the memory 210 which have been addressed just now.

In such a manner, an address in either of the address register 212 or 208 is selected depending on the communication format and the received data is stored in the selected address of the memory 210.

An address generating circuit may be added to the receiver side.

The conventional well-known method may be taken in which a hold request may be provided to the CPU to perform the DMA in response to a hold ACK from the CPU. Furthermore, the number of words may be suitably selected, if desired.

In accordance with the third embodiment, the same procedure as that of the prior art can be completely used to store the received data in the memory, during the communication of a great deal of data including the number of words larger than a predetermined number of words. Furthermore, the pre-reception procedure can be simplified to realize a high-speed data communication during the transmission of a small quantity of data including a predetermined number of words.

(4) Fourth Embodiment

Figure 11:
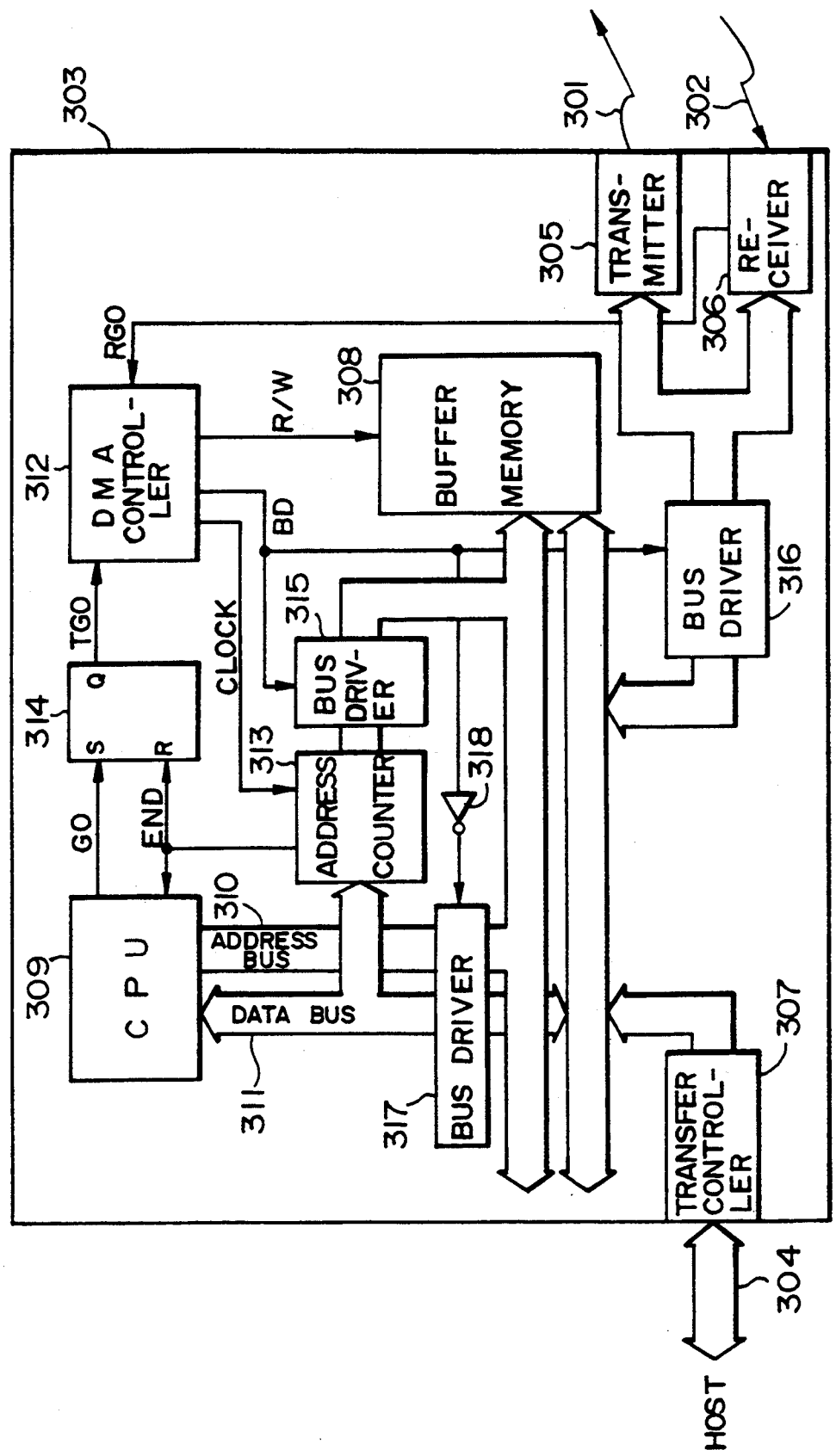
FIG. 11 is a block diagram of the fourth embodiment of the present invention.

FIG. 11 is a block diagram of the fourth embodiment of the present invention which utilizes such a buffer memory as in the second embodiment. The fourth embodiment comprises communication circuits 301 and 302 of optical fibers, and a communication control device 303 which is connected to companion devices through the communication circuits 301 and 302 and connected to a host through a bus 304.

In FIG. 11, the communication control device 303 comprises a transmitter 305 for sending data through the communication circuit 301; a receiver 306 for receiving the transmitted data through the communication circuit 302; a transfer controller 307 for controlling the data transmission between the communication control device 303 and the host; a buffer memory 308 for temporarily storing the transmitted or received data; a communication controlling CPU 309 connected to the address and data buses 310 and 311; a DMA controller 312 for controlling the DMA transfer to the buffer memory 308; an address counter 313 for addressing the buffer memory 308 on the DMA operation; a flip flop 314 for generating a start signal TGO in response to a signal GO from the CPU 309; bus drivers 315, 316 and 317; and an inverter 318.

Figure 12:
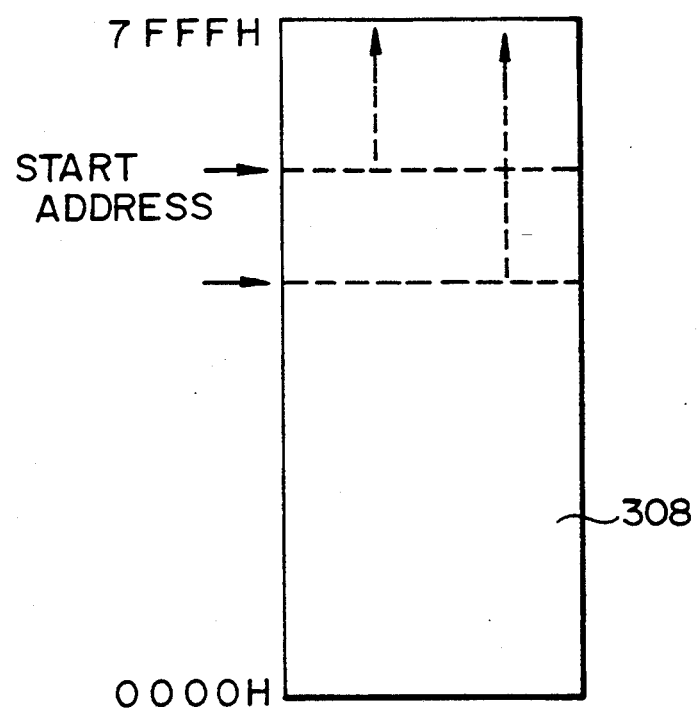
FIG. 12 is a memory map illustrating the operation of the fourth embodiment.

As shown in FIG. 12, the buffer memory 308 has a memory space between 0000H and 7FFFH and the address counter 313 includes a 16-bit up counter. Fifteen bits except the most significant bit are provided to the buffer memory 308 through the driver 315, the most significant bit output being a signal END which is inputted into the reset terminal of the flip flop 314 and the interrupt terminal of the CPU 309.

The address counter 313 thus sequentially counts up starting from the start address set therein. When the address reaches 8000H beyond the most significant address 7FFFH in the buffer memory 308, the address counter 313 outputs a signal END.

The operation of the fourth embodiment will now be described.

Prior to data transmission, data to be transmitted from the host has been previously stored in the buffer memory 308 through the transfer controller 307. The data is sequentially stored in the buffer memory 308 starting from the low-order address such that the last data in the transmitted data will be stored in the buffer memory 308 at the most significant address 7FFFH. For example, if data of 256 words are to be transmitted, these data will be stored in addresses from 7F00H to 7FFFH.

Subsequently, the start address 7F00H is set at the address counter 313 through the CPU 309 which in turn generates a signal GO used to start the DMA controller 312.

As the signal GO is outputted, the flip flop 314 is set to make its output TGO "1". When this occurs, the DMA controller 312 makes the signal BD "1" to open the bus drivers 315 and 316 and to close the bus driver 317. At the same time, a writing is carried out by making a read/write signal R/W "0". Thus, the data of start address 7F00H is read out of the buffer memory 308 and then transmitted from the transmitter 305 to the other device through the communication circuit 301. As the reading is terminated for one word, the DMA controller 312 generates one clock signal CLOCK in response to which the address counter 313 counts up.

While the signal TGO remains at "1", the above cycle is repeated such that data will be sequentially outputted from the buffer memory 308 at the successive addresses starting from the start address through the communication circuit.

After data has been read out of the buffer memory at the address 7FFFH and when the address counter 313 counts up, a signal END is generated to reset the flip flop 314 and to interrupt the CPU 309. Since the output signal TGO becomes "0" when the flip flop 314 is reset, the DMA controller 312 terminates its DMA operation and the CPU knows the termination of DMA by the interrupt signal.

On the other hand, for reception of data, the communication control device receives a start address through the communication circuit, the start address being then set at the address counter by the CPU 309. As in the data transmission, this address also is set such that the last data of the received data is stored in the buffer memory 308 at the most significant address 7FFFH.

The receiver 307 provides a start signal RGO to the DMA controller 312 each time when the receiver 306 receives data of one word.

In response to the input signal RGO, the DMA controller 312 makes the signal BD "1" and the signal R/W "1". The received data is thus written into the buffer memory 308 at the start address. After this writing, the address counter is caused to count up by a clock from the DMA controller 312. In such a manner, the received data is sequentially stored in the buffer memory at the successive addresses starting from the start address. If the data is stored in the buffer memory at the most significant address 7FFFH, the DMA cycle is terminated by a signal END from the address counter 313. Under such a state, all the received data is stored in the buffer memory 308.

Although the address counter 313 has been described to count up, it may be of a count-down type. In such a case, the DMA may be terminated at the next counting down step to all "0".

In accordance with the fourth embodiment of the present invention, the number of counters can be reduced and also the pre-communication procedure can be simplified to realize a high-speed communication.

What is claimed is:

1. A communication control system, comprising:
a communication cable having first and second ends,
   a transmission side communication control device operably connected to the first end of the communication cable and a receiving side communication control device operably connected to the second end of the communication cable;
wherein the transmission side communication control device includes an address bus, a data bus, a transmission side CPU connected to the address bus and the data bus, said transmission side CPU defining an address space section having a first portion and outputting an address, data and a write signal during execution of a write instruction, the address being output to the address bus and the data being output to the data bus, transmitter means coupled to the address bus, the data bus and the first end of the communication cable for receiving a portion of the address from the address bus and the data from the data bus and transmitting the address portion and data to the communication cable, and transmission control means coupled to the transmission side CPU and the transmitter means for causing the portion of the address and the data to be sent to the transmitter means only when the address output by the transmission side CPU corresponds to the first portion of the transmission side CPU address space section and the write signal is output by the transmission side CPU; and
wherein the receiving side communication control device includes receiving means coupled to the second end of the communication cable for receiving the address portion and data from the communication cable, memory means coupled to the receiving means for storing the data received by the receiving means, and reception control means coupled to the receiving means and the memory means for controlling the memory means to store the received data in accordance with the received address portion, wherein the address has a low-order bit portion containing at least one low-order bit and a high-order bit portion containing at least one high-order bit, the first portion of the transmission side CPU address space section is assigned to a transmitting area on which no memory is allocated and a second portion of the transmission side CPU address space section is assigned to a memory, and the transmission control means causes only the low-order bit portion of the address to be sent to the transmitter means, the reception control means generate high-order address bits independently of data in the address on the address bus of the transmission side communication control device, and the reception control means control the memory means of the receiving side communication control device to store received data in accordance with an address formed by the received address portion and the high-order address bits generated by the reaction control means.

2. A communication control system as claimed in claim 1, wherein the receiving side communication control device includes address generating means for generating an upper order bit which is to be added to the address received by the receiving means.

3. A communication control system as claimed in claim 1, wherein the first portion of the transmission side CPU address space section is assigned to a transmitting area, the transmission side communication control device includes an address register operatively connected between the address bus and the transmitter means and a data register operatively connected between the data bus and the transmitter means and the transmission control means includes address decoder means connected in the transmission control means for decoding an upper order bit in the address output by the transmission side CPU, means connected to the address and data registers to deliver control signals for controlling the address and data registers to respectively latch the portion of the address on the address bus and the data on the data bus in response to the write signal from the transmission side CPU and means for controlling the transmitter means to transmit the address and data respectively latched in the address and data registers.

4. A communication control system as claimed in claim 1, wherein the transmission side communication control device includes means in the transmission control means and connected to the transmitter means for adding an identification bit to information transmitted by the transmitter means, the identification bit indicating that the information is one of address and data, and the receiving side communication control device includes means connected between the receiving means and the reception control means for reading the identification bit to determine whether the transmitted information is address or data.

* * * * *